United States Patent [19]

Kempas

[11] Patent Number: 4,612,819

[45] Date of Patent: Sep. 23, 1986

[54] TORQUER FOR GYROS

[76] Inventor: Hagen Kempas, Kreuzstrasse 25 A, D-7770 Überlingen 12, Fed. Rep. of Germany

[21] Appl. No.: 682,380

[22] Filed: Dec. 17, 1984

[30] Foreign Application Priority Data

Dec. 21, 1983 [DE] Fed. Rep. of Germany ....... 3346185

[51] Int. Cl.$^4$ .................. G01C 19/28; G01C 19/30
[52] U.S. Cl. .................. 74/5.46; 74/5.6 D; 74/5.6 E
[58] Field of Search .............. 74/5.46, 5.6 R, 5.6 D, 74/5.6 E

[56] References Cited

U.S. PATENT DOCUMENTS

| 2,746,301 | 5/1956 | Henderson | 74/5.6 D |
|---|---|---|---|
| 2,964,952 | 12/1960 | Hoover et al. | 74/5.6 D |
| 3,107,540 | 10/1963 | Curriston | 74/5.6 D X |
| 3,147,627 | 9/1964 | Hunn | 74/5.6 D |
| 3,241,377 | 3/1966 | Newton | 74/5.6 R |
| 3,267,746 | 8/1966 | Scotto | 74/5.6 D |
| 3,438,270 | 4/1968 | Binder et al. | 74/5.47 |
| 3,475,971 | 11/1969 | Binder et al. | 74/5.6 E |
| 4,487,083 | 12/1984 | Quermann | 74/5.46 |

FOREIGN PATENT DOCUMENTS

| 3213720 | 10/1983 | Fed. Rep. of Germany. | |
|---|---|---|---|
| 2372412 | 6/1978 | France | 74/5.6 E |
| 2040450 | 5/1983 | United Kingdom. | |

OTHER PUBLICATIONS

Tietze and Schenk, "Halbleiter-Schaltungstecknik" Springer-Verlag, 2nd edition, pp. 367-372.

Primary Examiner—Rodney H. Bonck
Attorney, Agent, or Firm—Lee, Smith & Zickert

[57] ABSTRACT

In a dry tuned gyro, two pairs of coils 44 having ferromagnetic cores 46 are provided as torquers, which act on a ferromagnetic gyro rotor 36. The coils 44 are each angularly offset by 90°. Opposite coils 44 are energized in opposite directions by a direct-current signal and provide a torque. Due to the core 46 only low currents are required for that. The coils 44 are supported on sensors 48, which respond to forces of reaction. The sensors 48 include crystal oscillators and supply a torque signal in the form of a frequency. Simultaneously alternating currents are applied to the pairs of coils 44 and act as position pick-offs as well due to the variation of the inductivities. The pick-off signal from one of the pairs of coils 44 controls the direct-current signal for the other pair, and vice versa.

9 Claims, 6 Drawing Figures

TORQUER FOR GYROS

The invention relates to a torquer for exerting a torque by means of current-carrying coils on a gyro rotor rotating about a spin axis.

Electrically restrained gyros responding to angular rates are known, which gyros have a gyro rotor driven about a spin axis and mechanically mounted in a housing freely movable about two axes, which are mutually orthogonal and perpendicular to said spin axis. In a dry tuned gyro an electric driving motor is arranged in a housing, the rotor of said driving motor being mounted in bearings in the housing. The gyro rotor is connected to said rotor by means of a Cardan joint rotating therewith. The joint axes of the Cardan joint are formed as a torsion spring. The spin axis of the gyro rotor tends to maintain its attitude in inertial space. With deflection of the housing relative to this spin axis, spring torques are exerted by the torsion springs. In a dry tuned gyro these spring torques are completely compensated for by dynamic torques. Thereby the gyro rotor is mounted practically free from torques in case of small deflection angles. Pick-offs are provided, which respond to the deviation of the gyro rotor from a central position about a first input axis and about a second input axis perpendicular to the first one and to the spin axis. Furthermore, torquers having coils are arranged on the input axes. The torquers are controlled by the pick-off signals such that the pick-off responding to the deflections about one of the input axes is applied to the torquer acting about the other input axis, and vice versa. Thus a torque counteracting the deflection is provided on the gyro rotor. This torque, which is required for keeping the gyro rotor in its central position relative to the housing, is proportional to the inertial angular rate of the housing about the input axis concerned.

In known gyros of this type (U.S. Pat. No. 3,438,270), the gyro rotor comprises a magnetic ring, which interacts with pairs of housing-fixed ironless coils arranged in the air gap for generating the torque. The current passing through the coils is then directly indicative of the torque exerted on the gyro rotor. To ensure this proportionality and freedom of hysteresis, ironless coils have to be used. Such coils, however, require relatively high current intensities for providing the required torque. Thereby the ohmic reistance of the coils causes a correspondingly high stray power. This results in undesirable heating of the gyro, which can impair its operation. The obtained signal proportional to the torque is an analog signal. With digital signal processing this analog signal must be transformed into a digital signal by means of an analog-to-digital converter.

British Pat. No. 2 040 450 discloses an electrically restrained two-axis rate gyro with a first and a second input axis, which are mutually perpendicular and perpendicular to the spin axis. A first pick-off and a first torquer are arranged on the first input axis, and a second pick-off and a second torquer are arranged on the second input axis. The signal from the first pick-off is applied through an appropriate transient behavior network and amplifier means to the second torquer. The signal from the second pick-off is similarly applied to the first torquer. With this construction, the gyro is suspended in gimbals, and the pick-offs and torquers have stators and rotors connected to the various gimbals.

It is the object of the invention to reduce the stray power in a torquer of the present type.

According to the invention this object is achieved in that (a) the coils have ferromagnetic cores, are aligned substantially axially with regard to the spin axis and arranged in front of a ferromagnetic surface of the gyro rotor, which surface is substantially perpendicular to the spin axis, and (b) the coils are supported on force-measuring sensors which are acted upon by the forces of reaction acting on the coils and the signals of which provide a torque signal proportional to the torque exerted.

By using axially aligned coils having ferromagnetic cores the required torques can be provided by considerably weaker currents as compared to those required with ironless coils in the prior art device. However there is no exact proportionality between current and torque. Hysteresis occurs as well. For this reason the torque is determined by means of force-measuring sensors from the force of reaction acting on the coils.

An embodiment of the invention will now be described in greater detail with reference to the accompanying drawings.

Figure 1:
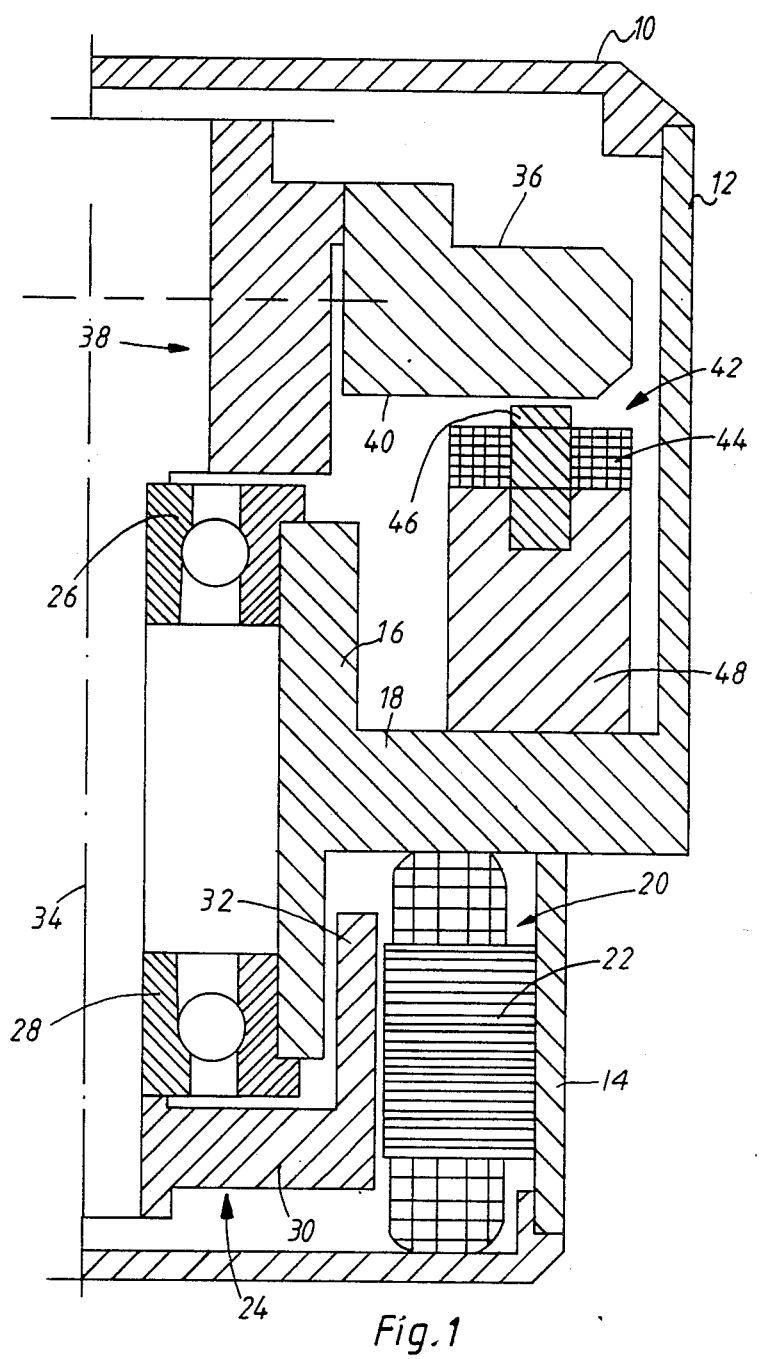
FIG. 1 shows half of a longitudinal section of a gyro having a torquer. The other half of the longitudinal section is symmetric thereto.

The gyro has a housing 10. This housing 10 consists of an upper portion 12 having a large diameter and a lower portion 14 having a small diameter. A bearing sleeve 16 is mounted in the housing 10 by means of an annular partition 18. The partition 18 forms the lower end (in the figure) of the upper portion 12. The bearing sleeve 16 extends partly into the upper portion 12 and partly into the lower portion 14. An electric driving motor 20 formed as a synchronous hysteresis motor is located in the lower portion 14. The driving motor 20 has a stator 22 located in the lower portion 14 and a rotor 24. The rotor 24 is mounted in the bearing sleeve 16 by means of bearings 26 and 28. It has a radial portion 30 and a cylindrical portion 32 connected thereto, which extends around the lower end (in the figure) of the bearing sleeve 16, such that the cylindrical portion 32 extends between the stator 22 and the lower end (in the Figure) of the bearing sleeve 16. Thus the rotor 24 is driven about a housing-fixed axis 34.

A gyro rotor 36 of ferromagnetic material is connected to the rotor 24 through a Cardan joint 38. The Cardan joint 38 is, as described above, constructed with torsion springs and so tuned that the gyro rotor 36 is freely movable for small deflection angles about two mutually orthogonal axes.

The construction of such a Cardan joint is well known in the art and therefore is not described in detail. For example the Cardan joint 38 may be of the type described in U.S. patent application Ser. No. 484,134, filed Apr. 12, 1983.

The gyro rotor 36 has a surface 40 perpendicular to its spin axis, this surface being made of a ferromagnetic material. A torquer 42 for exerting a torque on the gyro rotor 36 about a first input axis perpendicular to the paper plane of the figure comprises two coils 44 having ferrogmanetic, magnetically biassed cores 46 and being angularly offset by 180° about the spin axis, one the coils 44 only being illustrated in FIG. 1. A further pair of such coils is displaced by 90° relative to the sectional view illustrated in FIG. 1. The coils 44 of each pair can be energized in opposite directions by a direct-current signal. Thereby they exert a torque on the surface 40 and the gyro rotor 36. Just a relatively small coil current is required therefor because of the ferromagnetic core 46.

The coils 44 having ferromagnetic cores 46 are supported on force-measuring sensors 48. When the coil 44 exerts a force on the gyro rotor 36, the same but opposite force is acting on the force-measuring sensor 48 as force of reaction. A torque signal proportional to the exerted torque is generated from the signals from the sensors 48.

The force-measuring sensors 48 include piezoelectric components, for example crystal oscillators, to which the forces of reaction are applied and which are arranged in an oscillatory circuit, which, as said torque signal, provides a frequency analog, for example proportional, to the exerted torque. The signal thus obtained is easily converted into a digital signal for subsequent digital processing, in contrast to the analog coil current of the prior art.

A pick-off signal is supplied to the coils 44. This pick-off signal depends on the deflection of the gyro rotor 36 from a central position relative to the housing 10. A torque counteracting the deflection is thereby exerted on the gyro rotor 36 by the torquer 42. The coils 44 of the torquer 42 may serve, at the same time, as components of the pick-off. As mentioned, two coils 44 are provided, which are angularly offset by 180° about the spin axis and which can be energized in opposite directions by a direct-current signal. At the same time an alternating voltage is applied to the coils 44. Coils 44 are interconnected such that a resulting pick-off signal depending on the deflection of the gyro rotor is picked-off from the circuit. When the spin axis of the gyro rotor 36 deviates from the housing-fixed axis 34, for example in the plane of the paper in FIG. 1, the surface 40 of the gyro rotor 36 approaches the core 46 and the coil 44 on the righthand side, as illustrated, whereby the inductivity of coil 44 increases relative to the normal value. On the opposite side (not illustrated) the surface 40 moves away from the coil located there, whereby the inductivity of this coil decreases. With appropriate interconnection of the coils of each pair, pick-off signals can be obtained, which are analog to the deflection of the gyro rotor 36 from the central position. These pick-off signals, in turn, control direct-current signals, which are supplied to a torquer. Because of the gyro mechanics, the arrangement is such that, as already mentioned above, two torquers are provided, each of which acts about one of two input axes, which are mutually orthogonal and perpendicular to the spin axis, that is about an input axis perpendicular to the plane of the paper in FIG. 1 and about an input axis located in this plane. Each of these torquers, for example 42, consists, in the described way, of two coils 44, which have a core 46 and which are angularly offset by 180° about the spin axis and which can be energized in opposite directions by a direct-current signal. An a.c. voltage is applied, at the same time, to each pair of coils 44. The coils are interconnected such that a resulting pick-off signal depending on the deflection of the gyro rotor 36 is generated at the circuit. Each pick-off signal picked-off by one pair of coils 44 provides a direct-current signal, which is applied to the other pair of coils. Thus the coils 44 located in the plane of the paper in FIG. 1 provides, as pick-off, a pick-off signal, which, converted into a direct-current signal, is supplied to the coils located in a plane perpendicular to the plane of the paper.

The force-measuring sensors 48 then supply torque signals, which are proportional to the inertial angular rates of the housing 10 about the two input axes. These torque signals are available in the form of a frquency and therefore they can easily be processed digitally.

It is, of course, possible, to provide separate coils for the pick-offs, on one hand, and for the torquers, on the other hand. Such an arrangement is described in detail hereinbelow with reference to FIGS. 2 to 6. The construction of the gyro is similar to that of FIG. 1.

Torquer coils 44,44A,44B and 44C are placed on four cores 46,46A,46B and 46C, respectively, which are angularly spaced by 90°. Also placed on the cores 46,46A,46B and 46C are additional pick-off coils 50,50A,50B and 50C, respectively. The cores 46 and 46B with the torquer coils 44 and 44B, respectively, and the pick-off coils 50 and 50B, respectively, are arranged on the housing-fixed x-axis. The cores 46A and 46C with the torquer coils 44A and 44C, respectively, and the pick-off coils 50A and 50C, respectively, are arranged on the y-axis perpendicular to the x-axis.

Figure 3:
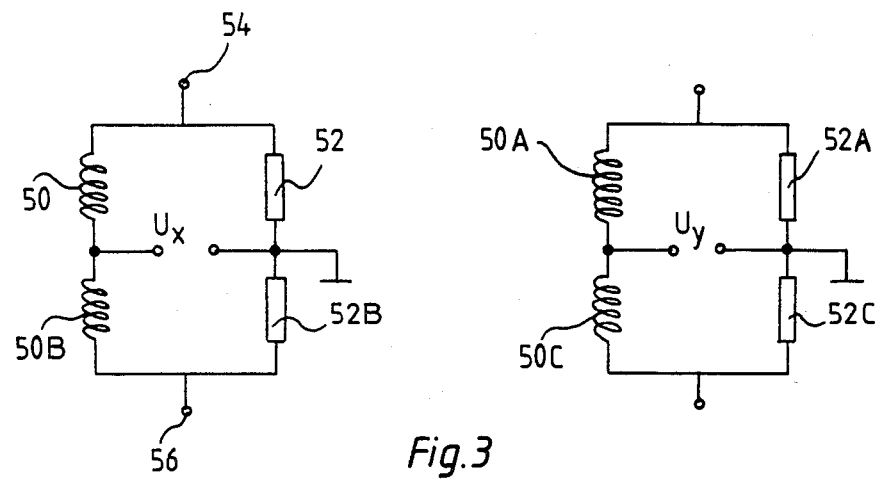
FIG. 3 shows the circuits for generating pick-off signals by means of the pick-off coils.

As can be seen from FIG. 3, the torquer coils 50 and 50B are arranged in a bridge circuit together with two resistors 52,52B. The bridge circuit is supplied with an a.c. voltage through terminals 54 and 56. The junction between the resistors 52 and 52B is grounded. A pick-off voltage $U_x$ is derived from the bridge diagonal. With deflection of the gyro rotor 36 with the ferromagnetic surface 40 about the y-axis, surface 40 approaches one pick-off coil, while it moves away from the other pick-off coil. Thereby the inductivities of the two pick-off coils are varied in opposite directions. Thereby an a.c. voltage $U_x$ results as pick-off voltage. This a.c.voltage is in phase or in anti-phase with the a.c. voltage supplied to the bridge circuit, depending on the direction of the deflection of the gyro rotor. Correspondingly the pick-off coils 50A and 50C are arranged in a bridge circuit together with resistors 52A and 52C. This bridge circuit provides a pick-off voltage $U_y$ indicative of the deflection of the gyro rotor 36 about the x-axis.

Figure 4:
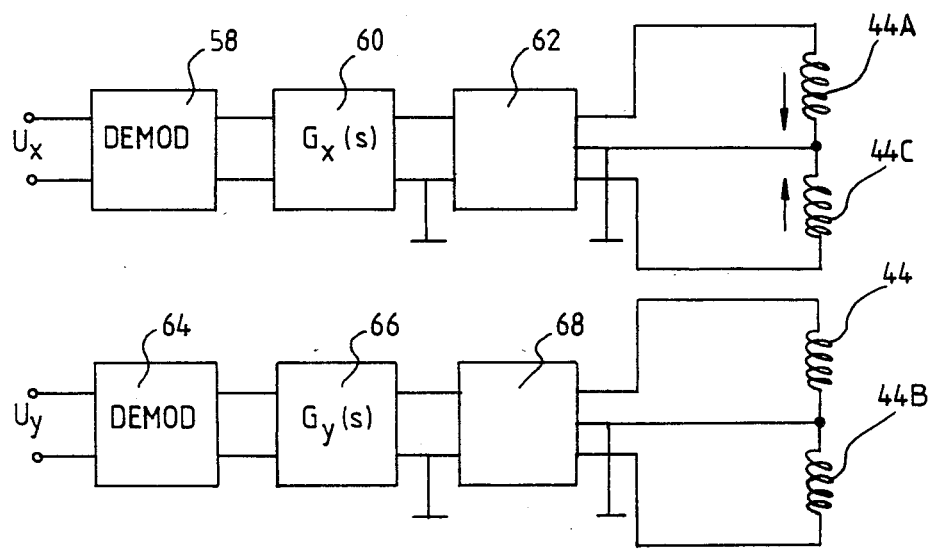
FIG. 4 shows the circuits for applying the pick-off signals to the torquer coils.

As can be seen from FIG. 4, the pick-off voltage $U_x$ is demodulated by means of a demodulator 58. The demodulator 58 provides a d.c. voltage the amount of which depends on the amplitude of the pick-off voltage derived from the bridge diagonal and the sign of which depends on whether this pick-off voltage is in phase or in antiphase with the a.c. voltage feeding the bridge circuit. The d.c. voltage thus obtained is applied to a network 60 by which in known manner a certain transient behavior desired for stability of the automatic control is achieved. The signal thus obtained is applied to the two torquer coils 44A and 44C through power amplifier means 62 such that magnetic fields of opposite directions are generated in the coils 44A and 44C, as indicated by the arrows in FIG. 4. These magnetic fields of opposite directions are superimposed to magnetic biasses, which are identical for both torquer coils. Therefore the flux density in one torquer coil is increased and the flux density in the other torquer coil is reduced correspondongly. Therefore a resultant torque about the x-axis is exerted on the gyro rotor 36. A torque about the x-axis ensues which counteracts the deflection of the gyro rotor 36 about the y-axis. Correspondingly, with a deflection of the gyro rotor 36 about the x-axis, the pick-off signal $U_y$ provided by the bridge circuit with the pick-off coils 50A and 50C is applied to the torquer coils 44 and 44B through a demodulator 64 and a network 66 and through power amplifier means 68, whereby a torque about the y-axis counteracting the deflection is exerted on the gyro rotor 36. Thus the gyro rotor is restrained electrically to a center position. Here the currents flowing in the torquer coils are, however, not porportional the generated torques because of the cores 46 etc. These torques are measured directly from the forces of reaction by means of sensors 48.

With cores consisting of soft iron the magnetic bias of the cores can be achieved by passing an additional constant current through the torquer coils, the currents caused by the pick-off signals being superimposed theron additively or subtractively.

Figure 5:
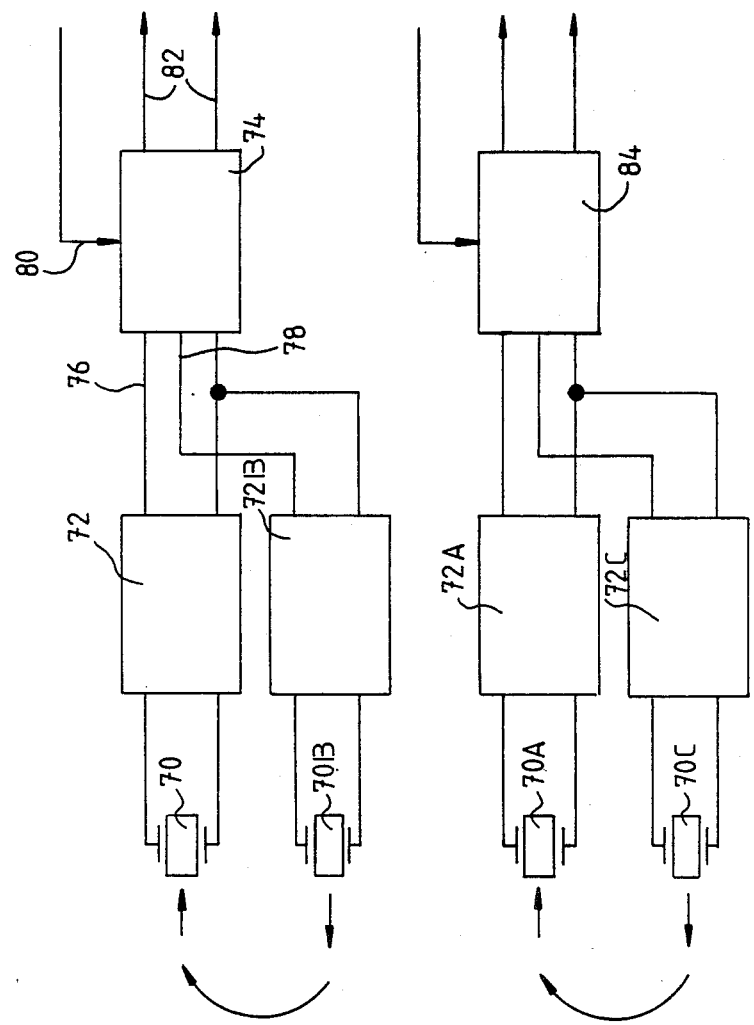
FIG. 5 is a block diagram and shows the circuit of the sensors responding to the reaction forces of the torquers.

The sensor arrangement is illustrated in FIG. 5.

A crystal sensor 70,70A,70B and 70C, respectively, is located below each torquer coil 44,44A,44B and 44C, respectively. The crystal sensors may be an oscillator quartz. The crystal sensors 70,70A,70B,70C are connected in an oscillator circuit each 72,72A,72B and 72C, respectively. The oscillation frequencies of the oscillator circuits are determined by the frequencies of the crystal sensors 70,70A,70B or 70C. These frequencies change when the crystal sensors are subjected to compressive loads.

A torque about the y-axis causes a load on one of the sensors arranged on the x-axis with, for example, the crystal sensor 70 and relieves the other sensor with the crystal sensor 70B correspondingly. Consequently the frequency of the oscillator 72 is varied in one direction and the frequency of the oscillator 72B is varied in the other, opposite direction. The output signals of the two oscillators 72 and 72B are applied to a bidirectional counter 74. The signals from oscillator 72 are applied to the "up" input 76 of the counter 74, and the signals from the oscillator 72B are applied to the "down" input 78 of the counter 74. The counter reading is interrogated at fixed time intervals by a clock pulse on input 80 and is read out as digital number at an output 82. The counter 74 is subsequently reset to zero.

In this way the torques are output digitally throughout a large measuring range and are available for digital data processing. Thus there is no need to digitize analog signals.

The force-measuring sensors with the crystal sensors 70A and 70C, the oscillators 72A and 72C and the counter 84 operate in the same way.

Oscillators of the present type are well known and are, for example, described in the book of Tietze and Schenk "Halbleiter-Schaltungstechnik" Springer-Verlag, 2nd edition pages 367ff. An example of such an oscillator is illustrated in FIG. 6.

Figure 6:
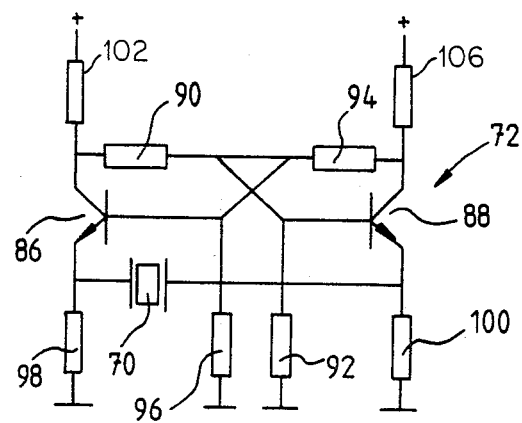
FIG. 6 shows an example of an oscillator for use in the circuit of FIG. 5.
Figure 2:
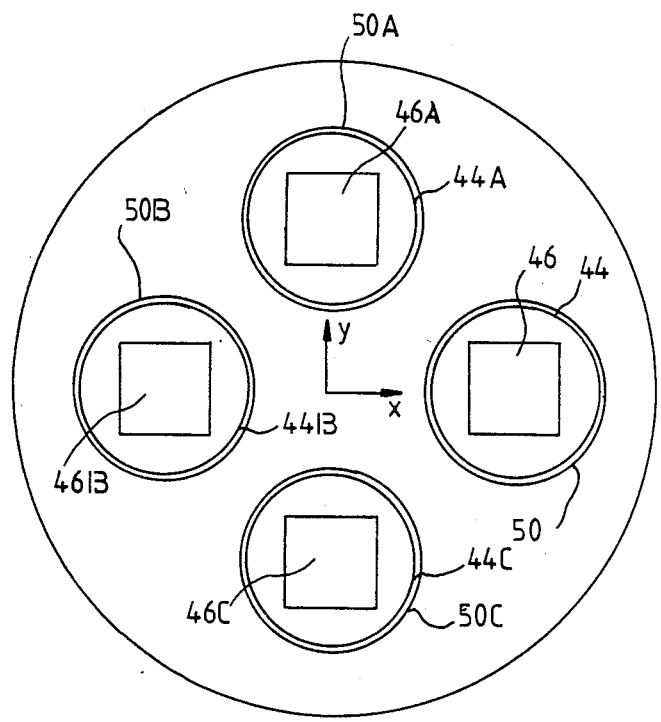
FIG. 2 shows schematically the arrangement of pick-off and torquer coils in the housing around the spin axis of the gyro.

The oscillator 72 of FIG. 6 uses an oscillator quartz as crystal sensor 70 in series resonance. Two transistors 86,88 form a two-stage amplifier which has positive feedbacks through voltage dividers 90,92 and 94,96, respectively. Negative current feedback is caused by emitter resistors 98 and 100, respectively. This negative current feedback is so strong that the circuit would be stable without the oscillator quartz. Numerals 102 and 106 designate the collector resistors.

At the series resonance frequency of the crystal sensor 70, the crystal sensor 70 interconnects the two emitters of the transistors 86,88 through a low impedance, whereby the negative current feedback is disabled. Because of the then prevailing positive feedback, an oscillation with the series resonance frequency results.

I claim:

1. Torquer for exerting a torque by means of current-carrying coils acting on a gyro rotor which is rotating about a spin axis, characterized in that
    (a) the coils (44) have ferromagnetic cores (46), are aligned substantially axially with regard to the spin axis and arranged adjacent a ferromagnetic surface (40) of the gyro rotor (36), which surface is substantially to the spin axis, and
    (b) the coils (44) are supported on force-measuring sensors (48) which are acted upon by the forces of reaction acting on the coils (44) and the signal of which provide a torque signal proportional to the torque exerted.

2. Torquer as set forth in claim 1, characterized in that the force-measuring sensors (48) include piezoelectric components on which the forces of reaction act and which are arranged in an oscillator circuit, which supplies a frequency proportional to the torque exerted.

3. Torquer as set forth in claim 2, characterized by
    (a) said piezoelectric components include two pairs of diametrically opposite piezoelectric components (70,70B and 70A,70C) angularly offset by 90°, each of said components being connected in an associated said oscillator circuit, (72,72B and 72A,72C, respectively), said oscillator circuits providing output signals,
    (b) first and second bidirectional counters (74,84) having an "up" input (76) and a "down" input (78) each, each counter being associated with one of said pairs of oscillators,
    (c) means for applying the output signals of one oscillator (72,72A) of each pair to said "up" input (76) of the associated counter (44 and 84), and
    (d) means for applying the output signals of the other oscillator of each pair to the "down" input of the associated counter (74 and 84).

4. Torquer as set forth in claim 1, characterized in that a pick-off signal which depends on the deflection of the gyro rotor (36) from a central position relative to the housing (10) is supplied to the coils (44), such that the torquer (42) exerts a torque counteracting the deflection on the gyro rotor (36).

5. Torquer as set forth in claim 4, characterized in that
    (a) two pairs of coils (44) angularly offset by 180° about the spin axis and arranged to be energized in opposite directions by a direct-current signal are provided, and
    (b) the coils (44) are at the same time connected to an a.c. voltage and are interconnected such that a resulting pick-off signal depending on the deflection of the gyro rotor (36) is picked-off from the circuit.

6. Electrically restrained gyro responding to angular rates, comprising
    (a) a gyro rotor (36) operated about a spin axis and mechanically mounted freely movable in a housing

(10) about two axes, which are mutually orthogonal and perpendicular to said spin axis, (b) a pick-off, which responds to deflections of the gyro rotor (36) from a central position relative to the housing (10) and which provides a pick-off signal, and (c) a torquer (42) having coils (44), said torquer (42) being controlled by the pick-off signal and adapted to exert a torque counteracting the deflections on the gyro rotor (36), characterized in that (d) the coils (44) have ferromagnetic cores, (46), are aligned substantially axially with regard to the spin axis and arranged adjacent a ferromagnetic surface (40) of the gyro rotor (36), which surface is substantially perpendicular to the spin axis, and (e) the coils (44) are supported on force-measuring sensors (48) which are acted upon by the forces of reaction acting on the coils (44) and the signals of which provide a torque signal proportional to the torque exerted.

7. Gyro as set forth in claim 6, characterized in that (a) two torquers (42), each of which acts about one of two input axes that are mutually orthogonal and perpendicular to the spin axis, are provided, each of the torquers (42) being formed by two coils (44) angularly offset by 180° about the spin axis and arranged to be energized in opposite directions by a direct-current signal, (b) each pair of coils (44) has, at the same time, applied thereto an alternating voltage and the coils (44) are interconnected such that a resulting pick-off signal depending on the deflection of the gyro rotor (36) is picked-off from the circuit, and (c) each pick-off signal picked-off by a pair of coils (44) provides a direct-current signal, which is applied to the other pair of coils (44).

8. Gyro as set forth in claim 7, characterized in that it is formed as a dry tuned gyro.

9. Gyro as set forth in claim 8, characterized in that the force-measuring sensors (48) include piezoelectric components on which the forces of reaction act and which are arranged in an oscillator circuit, which supplies a frequency proportional to the torque exerted.

* * * * *